(12) United States Patent
Hardik (10) Patent No.: US 9,640,990 B2
(45) Date of Patent: May 2, 2017

(54) MODULAR POWER SUPPLY FOR DISTRIBUTION AUTOMATION SYSTEM

(71) Applicant: ABB Schweiz AG, Baden (CH)

(72) Inventor: Patel B. Hardik, Gujarat (IN)

(73) Assignee: ABB Schweiz AG, Baden (CH)

( * ) Notice: Subject to any disclaimer, the term of this patent is extended or adjusted under 35 U.S.C. 154(b) by 628 days.

(21) Appl. No.: 14/136,729

(22) Filed: Dec. 20, 2013

(65) Prior Publication Data

US 2014/0111008 A1   Apr. 24, 2014

Related U.S. Application Data

(63) Continuation of application No. PCT/IB2012/001235, filed on Jun. 21, 2012.

(51) Int. Cl.
| | |
|---|---|
| H02J 1/00 | (2006.01) |
| G05F 1/00 | (2006.01) |
| H02J 1/10 | (2006.01) |
| H02M 3/156 | (2006.01) |
| G05F 1/67 | (2006.01) |

(Continued)

(52) U.S. Cl.
CPC .............. *H02J 1/00* (2013.01); *G05F 1/00* (2013.01); *G05F 1/67* (2013.01); *G06F 1/26* (2013.01); *H02J 1/10* (2013.01); *H02J 1/102* (2013.01); *H02M 3/156* (2013.01); *H02M 3/285* (2013.01); *H01R 13/6675* (2013.01); *H02J 11/00* (2013.01);

(Continued)

(58) Field of Classification Search
CPC .... G05F 1/67; G05F 1/00; G05F 1/26; H02M 3/156; H02M 3/285; H02J 1/10; H02J 1/00; H02J 1/102

USPC ................ 363/65, 131, 97, 95, 20; 323/271; 307/11, 23, 42

See application file for complete search history.

(56) References Cited

U.S. PATENT DOCUMENTS

| | | |
|---|---|---|
| 5,138,543 A | 8/1992 | Harm et al. |
| 6,009,000 A | 12/1999 | Siri |

(Continued)

FOREIGN PATENT DOCUMENTS

EP    2 290 211 A1    3/2011

OTHER PUBLICATIONS

International Search Report (PCT/ISA/210) mailed on Aug. 31, 2012, by the IB Patent Office as the International Searching Authority for International Application No. PCT/IB2012/001235.

*Primary Examiner* — Arnold Kinkead
(74) *Attorney, Agent, or Firm* — Barnes & Thornburg LLP (57) ABSTRACT

An exemplary power supply module for distribution automation includes a manner of connecting an input power source to a power supply module and connecting an output of the power supply module to external devices, a manner of regulating, a rectification module generating output DC voltage, a transformer having a primary side connected with the regulating component and one or more power input power sources, and a secondary side connected to the rectification module, a manner of voltage feedback means for providing a voltage feedback signal to the regulating component to regulate the output DC voltage, and a load share control module having a load share signal for controlling load sharing for the power supply module. The power supply module includes a filter amplifier for conditioning the voltage feedback signal, where the filter amplifier is connected in the secondary side of the transformer for reducing noise in the power supply module.

10 Claims, 7 Drawing Sheets

(51) Int. Cl.
*G06F 1/26* (2006.01)
*H02M 3/28* (2006.01)
*H01R 13/66* (2006.01)
*H02J 11/00* (2006.01)

(52) U.S. Cl.
CPC ........ *Y10T 307/344* (2015.04); *Y10T 307/352* (2015.04); *Y10T 307/414* (2015.04)

(56) References Cited

U.S. PATENT DOCUMENTS

| | | | | |
|---|---|---|---|---|
| 6,433,522 B1* | 8/2002 | Siri | ............. | G05F 1/67 320/101 |
| 8,400,794 B2* | 3/2013 | Liu | ............. | H02J 1/10 323/272 |
| 2003/0173937 A1 | 9/2003 | Uematsu et al. | | |
| 2006/0239046 A1 | 10/2006 | Zane et al. | | |
| 2006/0273740 A1 | 12/2006 | Saeueng et al. | | |
| 2013/0021009 A1* | 1/2013 | Waltman | ............. | H02M 3/156 323/271 |

* cited by examiner

MODULAR POWER SUPPLY FOR DISTRIBUTION AUTOMATION SYSTEM

RELATED APPLICATION(S)

This application claims priority as a continuation application under 35 U.S.C. §120 to PCT/IB2012/001235, which was filed as an International Application on Jun. 21, 2013, designating the U.S., and which claims priority to Indian Application 2096/CHE/2011 filed in India on Jun. 21, 2011. The content of these applications are hereby incorporated by reference in their entireties.

FIELD

The present disclosure relates to power supplies modules for distribution automation system and particularly to a provision of power supply in remote input output devices such that more than one power supplies modules can be effectively connected together.

BACKGROUND INFORMATION

Several known Distribution Automation (DA) products call for input/output (IO) extensions, flexible local I/O replacements or other additional components to offer scalability. In case of remote I/Os, meaning self-contained I/O devices connecting physical, digital/analog I/O to other DA products, the remote I/O devices should be capable of supplying specified power to connected DA products. Specified power can be supplied through use of a power supply module. The power rating of the individual power supply module can be limited by the available height, board space and by the limitation on volumetric heat dissipation. For example, a power supply module in a remote I/O device can have a capability to supply a maximum of 7.5 W, for example, but under certain conditions supply 15 W. Under this condition, two power supply modules can be connected together in parallel. Thus, to supply higher power several parallel connected power supplies can be used. In addition to higher currents, the parallel modules can also offer redundancy, an important factor to achieve reliable, uninterrupted operation and extended life expectancy in the systems.

Independent power supply modules when connected in a parallel configuration can result in each of the independent power supply modules sharing unequal loads including sinking current instead of sourcing due to differences in operating point or output V-I characteristic, even when they are of similar kind. This condition can result in uneven distribution of electrical and thermal stress, and lead to a decrease in the life of overloaded power supply module. To avoid an unbalanced sharing of load current, a known technique is to include circuitry for proportionally distributing load current among parallel connected power supply modules depending on their individual capacity. This technique is referred to as "load sharing". Load sharing can be found in power supplies wherein more than one power module service a single load or has a common point such as on a common output voltage bus which supplies power to multiple loads. Further, the common output voltage bus should be provided in such a manner that independent power supply modules are capable of indicating their respective health status in spite of having multiple independent power supply modules connected in parallel. Each power supply module should be decoupled from any effect of having voltage output from a power supply combination be available at the output of each power supply module in the combination including that of the faulty supply.

In known implementations power supplies can use high frequency switching as a means for efficiently converting the input source to the desired DC voltage level. Power supplies can be designed to operate around a large range of high frequencies that may also generate noise capable of creating interference. The noise in power supply modules connected in parallel can result from cross talk/interference due to the coupling at the input/output and due to interaction from load sharing control loops of various modules used for proportionally distributing load current among parallel connected power supply modules. Such spreading of noise from a module across the entire system can lead to stability issues in any of the power supply modules, eventually risking the stability of the entire system. The task of controlling noise and improving stability can be challenging when there is no common input voltage source to the converter power supplies and/or the power supply modules support a wide input voltage range.

The noise and stability can be improved by effective decoupling which is achieved by reducing noise and cross talk in the system for reliable operation. Further, decoupling can also be specified for reliable health indication and communication in the system.

SUMMARY

An exemplary power supply module for a distribution automation system is disclosed comprising: means to connect an input power source to a power supply module and to connect an output of the power supply module to external devices; regulating means; a rectification module generating output DC voltage; a transformer having a primary side connected with the regulating means and one or more power input power sources, and a secondary side connected to the rectification module; voltage feedback means for providing a voltage feedback signal to the regulating means to regulate the output DC voltage; and a load share control module having a load share signal for controlling load sharing for the power supply module, wherein the power supply module includes a filter amplifier for conditioning the voltage feedback signal, said filter amplifier being connected in the secondary side of the transformer for reducing noise in the power supply module.

An exemplary modular power supply system for distribution automation system is disclosed comprising: a plurality of power supply modules having means to connect to one or more input power sources and to connect an output of each power supply module in parallel, wherein each power supply modules is independent and has regulating means, a rectification module for generating output DC voltage, a transformer having its primary side connected with the regulating means and with the input power source, and having its secondary side connected to the rectification module, voltage feedback means for providing a voltage feedback signal to the regulating means to regulate the respective output DC voltage, and a load share control module for controlling load sharing; a common output voltage bus connecting a respective output voltage from the plurality of power supply modules; and a common current share bus connecting a load share signal for a respective load share control module from the plurality of power supply modules, wherein at least one power supply module has a filter amplifier for conditioning a respective voltage feedback signal from the at least one power supply module, said filter amplifier being connected in the secondary side of the transformer for reducing noise in the modular power supply system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Exemplary embodiments of the present disclosure provide a power supply module including a means to connect to an input power source (e.g., through suitable terminals or bus connection), regulating means for regulating output DC voltage, a rectification module generating output DC voltage from high frequency switched voltage, a transformer having a primary side connected with the regulating means and the power input power source (one or more), and the secondary side connected to the rectification module, voltage feedback means (e.g., voltage divider) for providing voltage feedback signal to the regulating means to regulate the output DC voltage, connecting means to connect the power supply module with at least one other power supply module (e.g., through a bus connection when power supply modules are stacked together) and a load share control module for controlling load sharing for the power supply module. The power supply module in addition can have a filter amplifier connected to the secondary side of the transformer for reducing noise in the power supply module (e.g., in the voltage control loop in the power supply module).

In an exemplary embodiment of the present disclosure, the filter amplifier attenuates high frequency noise produced/appearing due to switching in a power supply module (e.g., multiple power supply modules are connected together). The filter amplifier at the secondary side of the power supply module together with a voltage error amplifier in the primary side of the power supply improve the signal to noise ratio in the power supply and improve stability.

In another exemplary embodiment of the present disclosure, the modular power supply module has a health check module to infer its health status based on comparison of the DC output voltage and a signal derived from an equivalent rectification module connected at the secondary side of the power supply module.

In yet another exemplary embodiment disclosed herein a modular power supply system has a plurality of power supply modules coupled at the output using a common output voltage bus and common current share bus. The power supply modules can be connected together in parallel by stacking them together without any additional settings or use of additional devices/signals.

In another exemplary embodiment, the modular power supply system having power supply modules connected in parallel is provided with independent and different input power sources.

In yet another exemplary embodiment of the present disclosure, the modular power supply system has some of the power supply modules provided with independent and different input power sources and some other power supply modules are provided with a common input power source.

Still in another exemplary embodiment, the modular power supply system has at least one power supply modules provided with backup battery input sources.

The present disclosure describes an exemplary technique to control noise and improve stability for power supply modules that are connectable in parallel for its use in a distribution automation system. These power supply modules are modular and can be mountable in a DIN rail and may have a common input voltage source or individual input source and support a wide range as input voltage.

Figure 1:
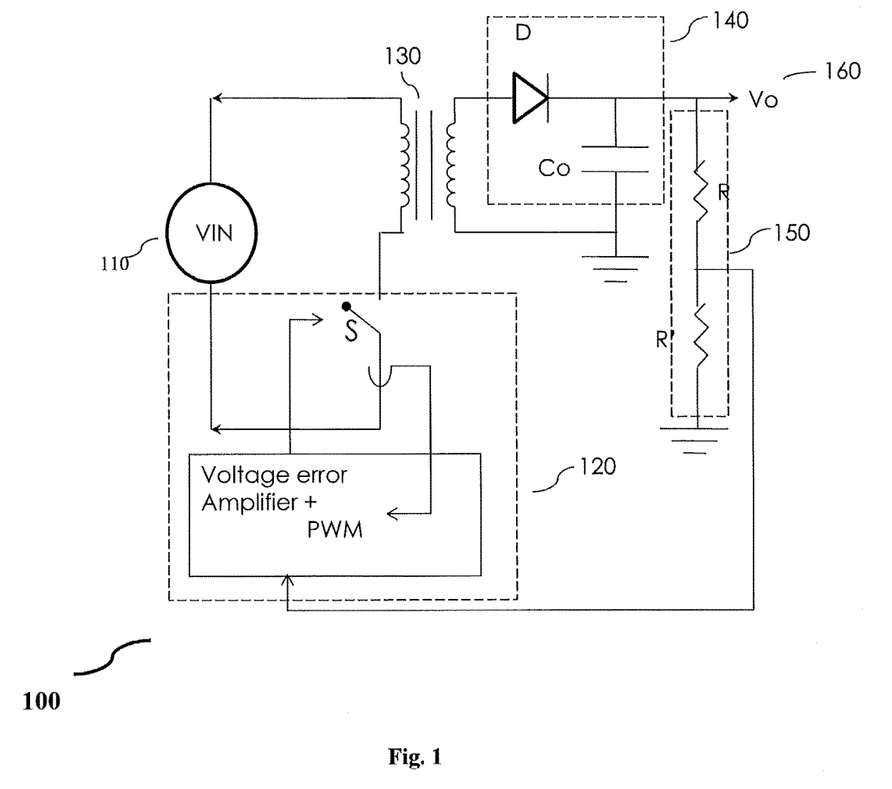
FIG. 1 is a circuit diagram illustrating an individual power supply module according to an exemplary embodiment of the present disclosure.

FIG. 1 is a circuit diagram illustrating an individual power supply module according to an exemplary embodiment of the present disclosure. As shown in FIG. 1, the power supply module 100 includes an independent input power source 110, a regulating means 120, a rectification module 140 generating output DC voltage 160, a transformer 130 having a primary side connected with the regulating means 120 and the input power source 110, and a secondary side connected to the rectification module 140, a voltage feedback means 150, voltage divider in the illustration, for providing voltage feedback signal to the regulating means 120 to regulate the output DC voltage 160 in the voltage control loop. The regulating means in the illustration is designed with use of a switching element (switch) which is driven by a PWM (Pulse width modulation) based control.

Applications where high power and a reliable powering solution is desired, more than one power supply modules are connected in parallel. A user is provided with the flexibility to connect a number of power supplies depending on the system specification including future specifications, where if any application demands more power, the user has flexibility to add more power supply modules as desired.

Some additional design considerations for realizing high power and reliable powering solutions are for the exemplary embodiments disclosed herein include:

a) All power supply modules may be identical without any segregation of master/slave type for controlling equal loading and are capable of working in a "standalone mode" or in "multiple power supply mode" without a selection/external device/extra connection or a fine setting of output voltage.

b) All power supplies may have independent input voltage source e.g., input voltage sources of each parallel connected power supplies (e.g., in "multiple power supply mode") can be different. For example, power supply module 1 (PSM1) can have 220 VAC as input source and power supply module 2 (PSM2) can have 110 VDC as an input source. The range can be wide, as an example the voltage for the power supply module can be in the range of 85-264 VAC or 88-375 VDC, for example. Further, the input voltage sources for parallel connected power supplies can be a power harvesting system which drains power from the HV power line or be an alternative energy system like a photovoltaic system or from a backup battery.

c) Parallel connected power supplies e.g., in "multiple power supply mode" can continue to work, even if any power supply has no input source, or any power supply in the parallel connection fails. In this mode, all the participating healthy power supplies share load current equally over the complete range of total load [e.g., according to (Power capacity of one power supply)×(No of power supplies connected together)]. The load sharing to be good even at light loads and have better load regulation.

d) In "multiple power supply mode", is OFF if any power supply module fails or an input source of any power supply module, other power supply modules in the parallel connection continue to work normally and so system will continue to work normally. Also the power supply that has failed or is OFF should communicate its health condition to the system. According to exemplary embodiments of the present disclosure the main output voltage control loop & health information for each module can be separated (decoupled) from the load share control mechanism. Each power supply module individually indicates and communicates its health status in an efficient manner.

Figure 2:
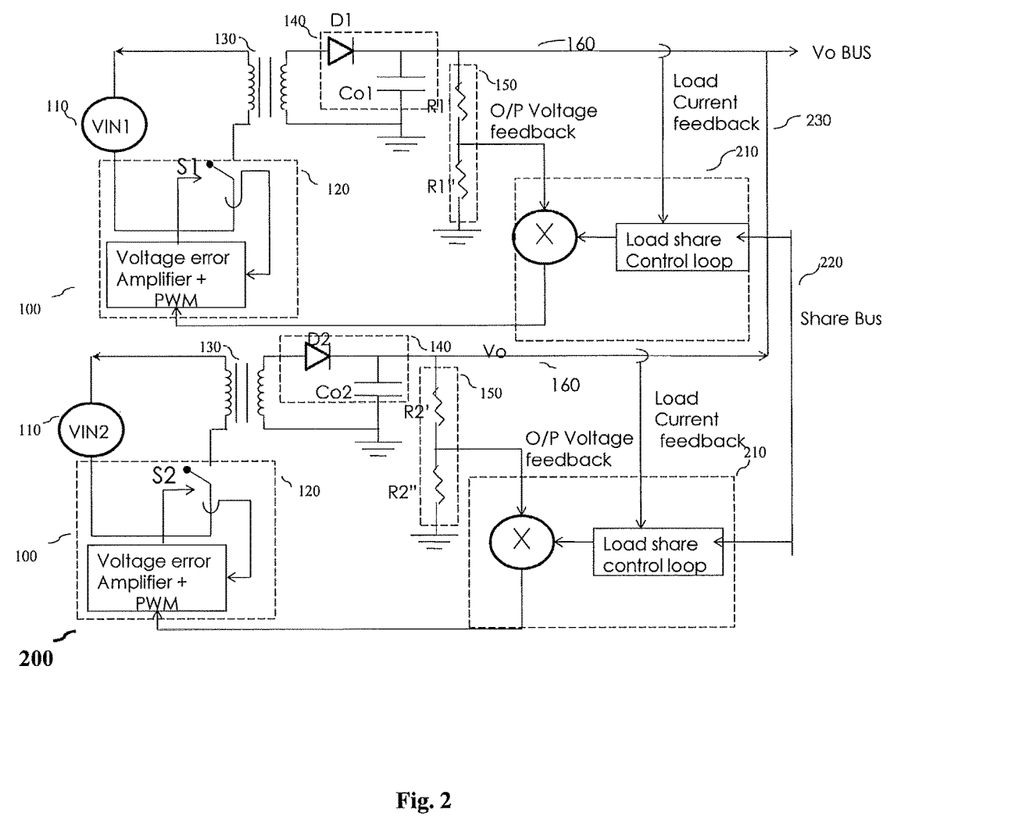
FIG. 2 is a circuit diagram illustrating two power supply modules connected in parallel according to an exemplary embodiment of the present disclosure.

FIG. 2 is a circuit diagram illustrating two power supply modules connected in parallel according to an exemplary embodiment of the present disclosure. As shown in FIG. 2, a power supply system 200 has two power supply modules 100 connected in parallel with load sharing circuitry. The load sharing circuitry has a load share control module 210 which is responsible for load sharing control, a common output voltage bus 230 resulting from a parallel coupling of output voltages of all the independent power supply modules and a common current share bus (SHARE signal) 220 which is used as a reference for load sharing.

The respective load share control module 210 in each of the power supply modules uses a common current share signal to have active load share control. According to exemplary embodiments disclosed herein the operating principle of a load share mechanism is to measure the output current of each individual module and modify the output voltage of the units, until all participating power supplies deliver equal output currents. Thus, all power supply modules actively make their load current equal to the common current share signal by appropriately controlling their respective regulating means 120.

The interaction of output voltage control/feedback loop & load sharing control loop are done in such a way that, the power supply module can work in a standalone mode and in a multiple power supply mode without a selection/external device/extra connection.

Further, the independent power supply modules may have a common input source or have independent input sources and each of the power supply modules can have input filter and protection, health status indication and communication, and output protection (not shown in the figure).

In "multiple power supply mode", all connected power supplies equally share total load current. Normally, each of the power supply modules work below their maximum load capacity. When specified power is more than the defined capacity of the single power supply or the power supply system in use, a user should put together (side by side) an additional specified number of power supplies and stack them together.

The parallel connected power supplies are configured to convert their independent input voltage to a defined DC output voltage. Each of the modules will continue to provide independent filtering and protection and health indication/communication. Apart from two terminals of the DC output voltage, the parallel connected power supplies share only one extra terminal (e.g., SHARE signal 220) between them, which indicates the maximum current supplied by any of the connected power supply. Each of the parallel connected power supplies try to make their shared load current equal to the SHARE signal (as in common current share bus), by using active current sharing technique over the complete range of load current even though their respective input sources or voltage ratings can be different.

Any noise, if significant in magnitude and phase in any of the power supply modules, will interfere in the power supply system and can negatively impact the system leading to undesired situations; one such situation being oscillations in power supply output. The source of noise in the voltage control loop in a power supply module 100 can be due to any of the following examples:

50/60 Hz line frequency
Variation in load (transient/low frequency)
Switching of power supply module (high frequency)

The Fourier components of noise undergo gain changes and phase shifts in filter and amplifier components in the system. If for any one of these Fourier components, the gain and phase shifts result in positive rather than negative feedback, the power supply module can have oscillations. So even if the initial source of noise signal dies out, the circuit can continue to oscillate at the specified frequency. A known technique for improving the stability of a power system is to increase the phase margin. Hence, to achieve stability in the voltage control loop, a sufficient phase margin at a gain cross over frequency (e.g., frequency at which open loop gain is unity) should be attained.

Further, taking the case of parallel connected power supply modules, when there are different sources/ratings of input voltages used for parallel connected power supply modules, the regulating means 120 in each module may switch at different duty cycles from one another. Therefore, disturbances due to switching can be different in each of the parallel connected modules. Under certain conditions disturbance/noise due to individual input sources 110 in each of the modules or due to switching operation in modules, can reflect on the share bus 220. So each parallel connected module can react to this disturbance in a different way (because they are operating at different duty cycles) thereby making crosstalk between different control loops prone to unstable operation.

Figure 3:
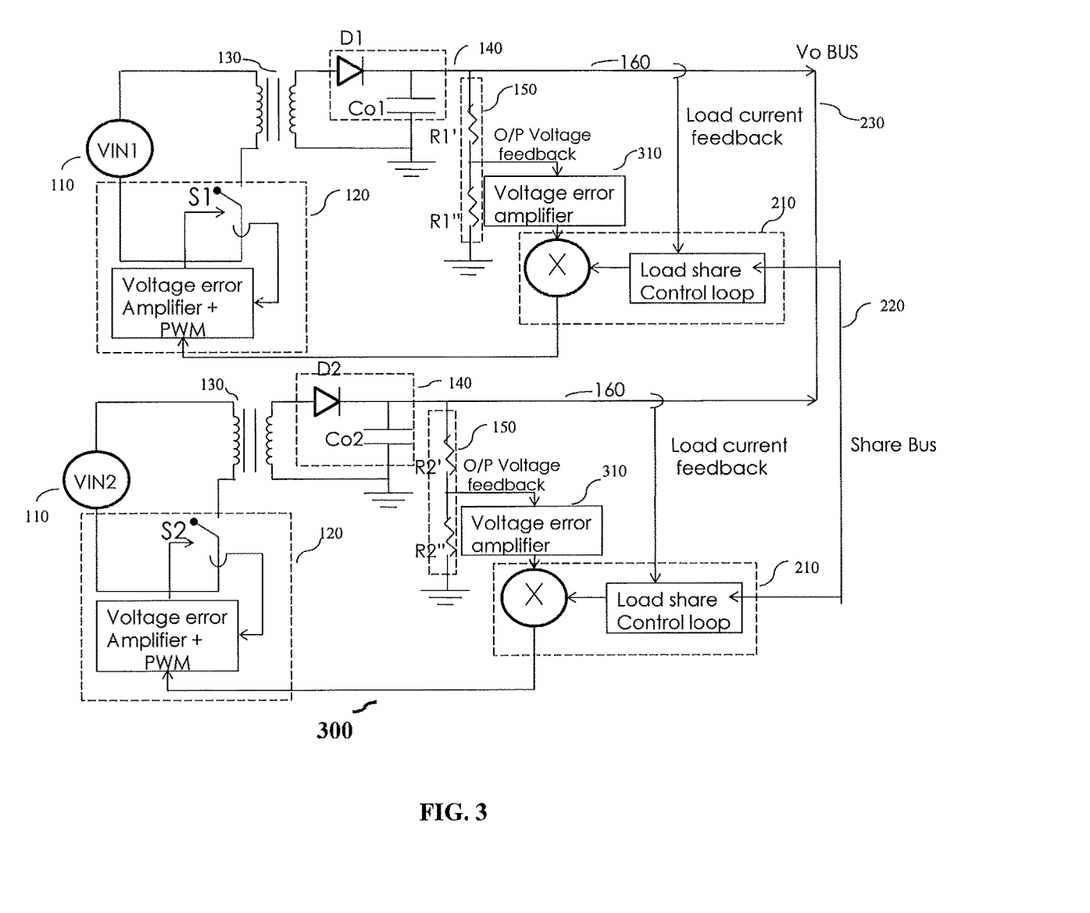
FIG. 3 is a circuit diagram illustrating two power supply modules with noise reduction capability connected in parallel according to an exemplary embodiment of the present disclosure.

FIG. 3 is a circuit diagram illustrating two power supply modules with noise reduction capability connected in parallel according to an exemplary embodiment of the present disclosure. As shown in FIG. 3, two power supply modules are connected in parallel and effectively decoupled from each other to achieve better stability during operation in standalone mode and in multiple power supply mode. The power supply system 300 has a common voltage bus and common current share bus for providing the power to the load by having each of the power supply modules sharing load equally. A filter amplifier 310 (voltage error amplifier) can be connected on the secondary side of the power supply module to condition the voltage feedback in the voltage control loop. The load share control module 210 can be configured to be slow acting, e.g., have a poor response to high frequency changes, which according to an exemplary embodiment is acceptable as it responds to equalize the mean (average) output current. The filter amplifier 310 and the voltage error amplifier in the regulating means 120, both provide filtering and gain to help achieve stability over the entire input voltage range. The filter amplifier 310 on the secondary side of the power supply module performs the following function:

Attenuates the noise due to switching and prevents the noise from going to the primary side voltage error amplifier in the regulating means 120.

Amplify the noise due to 50/60 Hz line the frequency and Variation in the load.

Variation affecting the load share control loop can be addressed by low gain provided by voltage error amplifier on primary 120. The use of a filter amplifier 310 on the secondary side and a voltage error amplifier in the PWM based module on the primary side of the regulating means 120, where both the components have different frequency response, provides for high phase margin in the power supply module. By using this approach, stability can be achieved over the wide input voltage range (e.g., for universal range of 85-264 VAC/88-375 VDC) and/or different input power sources including AC input sources for parallel connected power supply modules with equal load sharing.

Thus, with use of additional filter amplifier component 310, the effect of noise and thereby stability of power supply module and of the system is improved.

According to an exemplary of the present disclosure the another distribution automation system can have proper health indicators and health communication. For parallel power supply modules, the health status indication and communication for individual power supply module can be decoupled from that of others. A well-known approach to solve this problem is through the use of decoupling series diodes for each of the independent power supply modules. However, these diodes can cause power loss (max power loss=Output current X Diode voltage drop, at approximately 1 Volt) which has a negative impact on the system.

Figure 4:
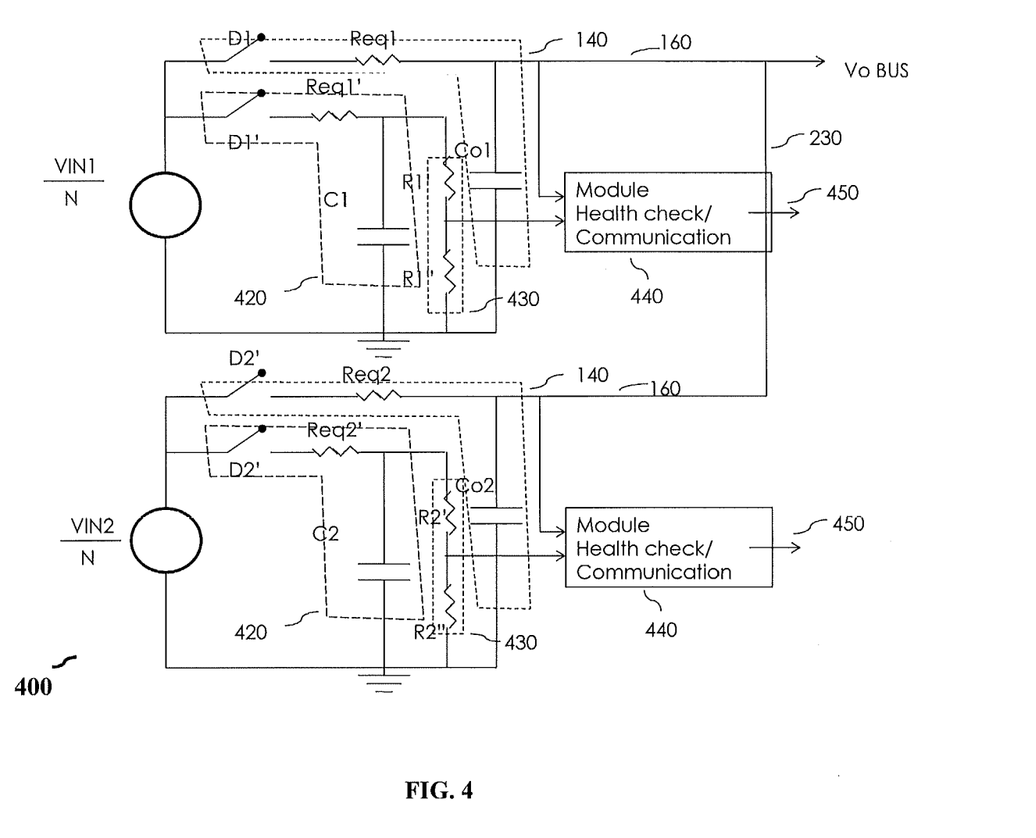
FIG. 4 is circuit diagram illustrating a health check module in two power supply modules connected in parallel according to an exemplary embodiment of the present disclosure.

FIG. 4 is circuit diagram illustrating a health check module in two power supply modules connected in parallel according to an exemplary embodiment of the present disclosure. As shown in FIG. 4, a technique for health indication and communication with a circuit diagram includes a secondary side of a power supply module having a rectification module 140 connected in parallel with an additional set of components to establish an equivalent rectification module 420. The circuit further has a voltage divider 430 provided with the equivalent rectification module 420. A health check module 440, associated with each power supply module includes a comparator to evaluate a health of the respective power supply module based on comparison of the signal from the voltage divider 430 with the common output voltage bus 230 to provide a health status signal 450. The equivalent rectification module 420 includes elements similar to the elements in the rectification module 140, however these elements can have a low power rating (as they are specified only for signal output) and hence consume little power. Since the equivalent rectification module 420 is not directly associated with the common output voltage bus 230, the power supply modules can be decoupled from each other for health indication. This technique for health indication and communication can be efficient as it does not affect the load current or output voltage from any of the modules involved in supplying power. The health check module can have LED indication to provide a health status and a communication module to communicate health status signal in the distribution automation system.

Figure 5:
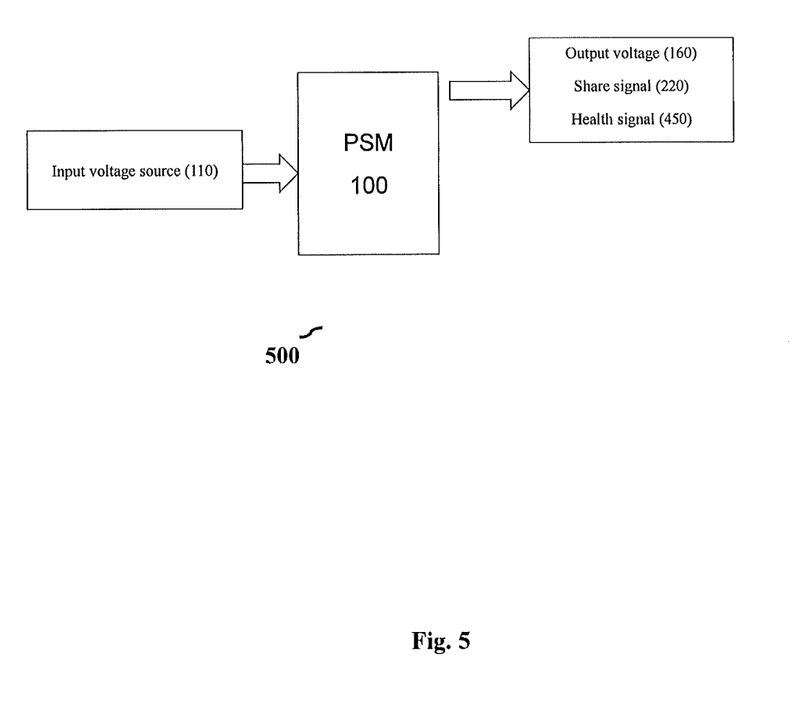
FIG. 5 is a block diagram illustrating a standalone mode of operation according to an exemplary embodiment of the present disclosure.

It may be noted that each power supply module provides for output DC voltage, SHARE signal, and health signal. FIG. 5 is a block diagram illustrating a standalone mode of operation according to an exemplary embodiment of the present disclosure. The Standalone mode is utilized when the specified power is within the defined capacity of a single power supply.

In another exemplary embodiment disclosed herein, two power supply modules can be connected in parallel, though the specified power can be within the defined capacity of a single power supply. In normal condition, when both input voltage sources are available, all connected modules share load current equally. When there is a problem in one of the power supply modules including the input voltage source, the healthy power supply module will continue to work normally by providing the specified load current. Here, the power supply modules are working in the multiple power supply mode though the specification of power is within the capacity of one power supply to increase reliability of the power supply system.

According to another exemplary embodiment, multiple power supply modules can be connected together having multiple combinations of input voltage source to improve reliability in a distribution automation system. The multiple power supply modules can share a common input voltage source or have independent input voltage sources.

Figure 6:
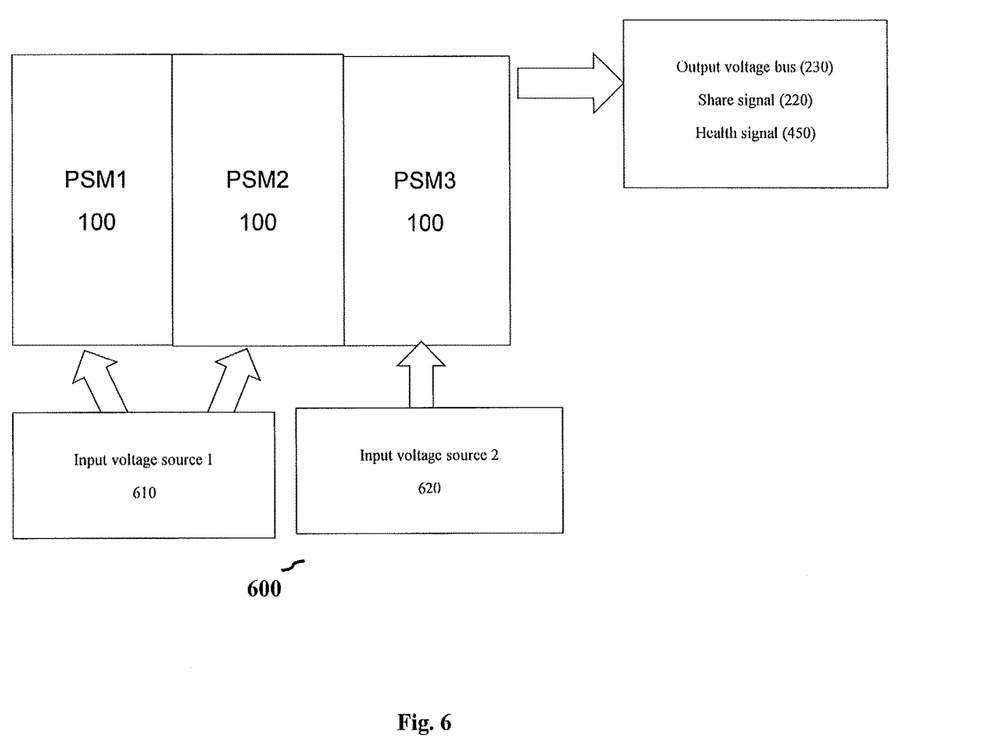
FIG. 6 is a block diagram illustrating multiple power supply mode of operation according to an exemplary embodiment of the present disclosure.
Figure 7:
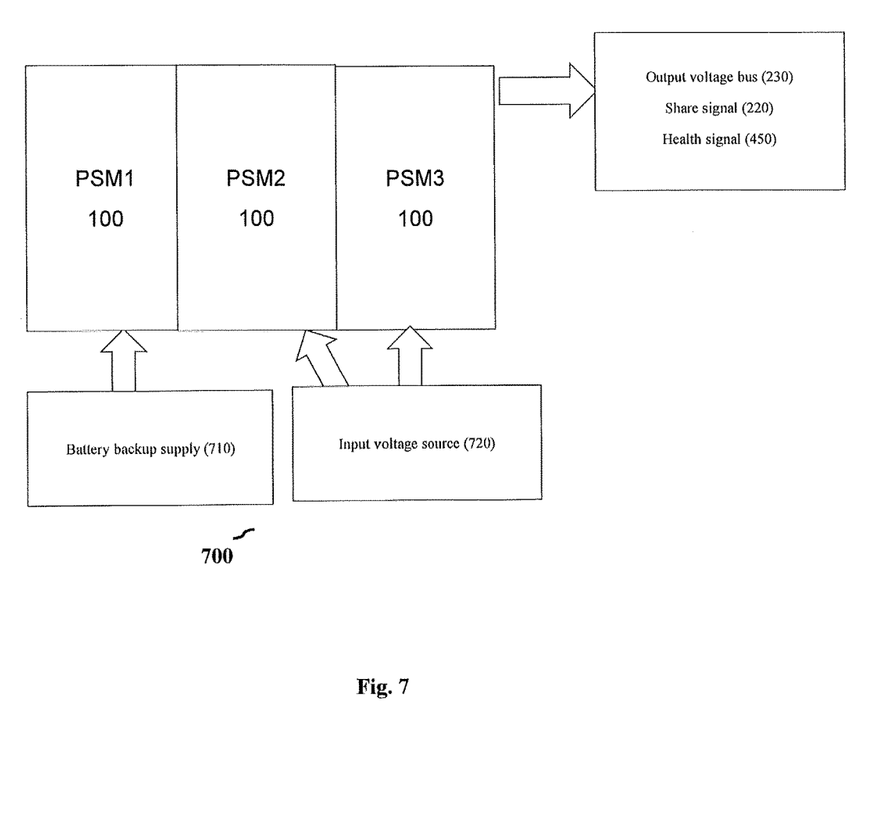
FIG. 7 is a block diagram illustrating multiple power supply modes of operation having a backup battery as an input source for one of the power supply modules according to an exemplary embodiment of the present disclosure.

FIG. 6 is a block diagram illustrating multiple power supply mode of operation according to an exemplary embodiment of the present disclosure. FIG. 7 is a block diagram illustrating multiple power supply modes of operation having a backup battery as an input source for one of the power supply modules according to an exemplary embodiment of the present disclosure. As shown in FIGS. 6 and 7, the multiple power supply modules may have input voltage source derived from input voltage sources that are less in number compared with the number of power supply modules connected together. As illustrated in FIG. 6, two input voltage sources (610 and 620) are used to provide input voltage to three power supply modules 100 connected together. FIG. 7 illustrates again a case with two input voltage sources (710 and 720) for three power supply modules (100) and also the use of a battery backup supply 710 to supply to a power supply module.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A power supply module for a distribution automation system, the power supply module being connectable in parallel and comprising:

a means to connect an input power source to the power supply module and to connect output of the power supply module to external devices;

a regulating means comprising a switching element which is controlled by a voltage error amplifier to regulate an output DC voltage;

a rectification module generating the output DC voltage;

a transformer having a primary side connected with the regulating means and one or more power input power sources, and a secondary side connected to the rectification module, wherein the switching element is adapted to control current on the primary side of the transformer;

a voltage feedback means for providing a voltage feedback signal to the regulating means to regulate the output DC voltage;

a load share control module having a load share signal for controlling load sharing for the power supply module; and a filter amplifier for conditioning the voltage feedback signal in a voltage control loop, the filter amplifier being connected on the secondary side of the transformer for reducing noise in the power supply module;

wherein the filter amplifier on the secondary side of the transformer and the voltage error amplifier of the regulating means on the primary side of the transformer each have a different frequency response to achieve stability over a wide input voltage range and different input power sources for parallel connected power supply.

2. The power supply module of claim 1, wherein the switching element is controlled through a conditioned voltage error signal from the voltage error amplifier in the primary side of the transformer.

3. The power supply module of claim 1, wherein the voltage feedback means comprises a voltage divider having resistive elements.

4. The power supply module of claim 1, wherein the filter amplifier attenuates high frequency noises appearing in the power supply module.

5. The power supply module of claim 1, further comprising:

a health check module to generate a health status of the power supply module based on comparison of the output DC voltage and a signal derived from an equivalent rectification module connected at the secondary side of the transformer, wherein the equivalent rectification module has similar components to the rectification module.

6. A modular power supply system for a distribution automation system comprising:

a plurality of power supply modules having means to connect to one or more input power sources and to connect an output of each power supply module in parallel, wherein each power supply module is independent and has regulating means comprising a switching element which is controlled by a voltage error amplifier to regulate an output DC voltage, a rectification module for generating the output DC voltage, a transformer having its primary side connected with the regulating means and with the input power source, and having its secondary side connected to the rectification module, voltage feedback means for providing a voltage feedback signal to the regulating means to regulate the respective output DC voltage, and a load share control module for controlling load sharing;

a common output voltage bus connecting the respective output DC voltage from the plurality of power supply modules; and a common current share bus connecting a load share signal for a respective load share control module from the plurality of power supply modules, wherein at least one power supply module has a filter amplifier for conditioning a respective voltage feedback signal from the at least one power supply module, said filter amplifier being connected in the secondary side of the transformer for reducing noise in the modular power supply system, and the filter amplifier on the secondary side and the voltage error amplifier of the regulating means on the primary side each have a different frequency response to achieve stability over a wide input voltage range and different input power sources for parallel connected power supply.

7. The modular power supply system of claim 6, wherein the plurality of power supply modules are provided with independent input power sources for each of the power supply modules.

8. The modular power supply system of claim 6, wherein at least two power supply modules from the plurality of power supply modules are provided with a common input power source.

9. The modular power supply system of claim 6, wherein at least one power supply module from the plurality of power supply modules is provided with a backup battery input source.

10. The modular power supply system of claim 6, wherein at least two power supply modules from the plurality of power supply modules are connected in parallel using a respective connecting means to connect their respective output DC voltage to the common output voltage bus and to connect a respective load share signal for a respective load share control module with the common current share bus without an additional setting or use of an additional device or an additional signal from the modular power supply system for proportional load sharing in said at least two power supply modules connected in parallel.

* * * * *